(12) United States Patent
Terakado et al.

(10) Patent No.: US 7,516,777 B2
(45) Date of Patent: Apr. 14, 2009

(54) COOLING JACKET

(75) Inventors: Shuichi Terakado, Mito (JP); Atsuo Nishihara, Kashiwa (JP); Shigeo Ohashi, Tsuchiura (JP); Rintaro Minamitani, Tsukuba (JP); Takashi Naganawa, Kasumigaura (JP)

(73) Assignee: Hitachi, Ltd., Tokyo (JP)

( * ) Notice: Subject to any disclaimer, the term of this patent is extended or adjusted under 35 U.S.C. 154(b) by 384 days.

(21) Appl. No.: 11/393,783

(22) Filed: Mar. 31, 2006

(65) Prior Publication Data
US 2006/0219388 A1 Oct. 5, 2006

(30) Foreign Application Priority Data
Mar. 31, 2005 (JP) .............................. 2005-102328

(51) Int. Cl.
*H05K 7/20* (2006.01)
(52) U.S. Cl. .................. 165/80.4; 165/170; 361/699
(58) Field of Classification Search ............... 165/80.4, 165/170; 361/699
See application file for complete search history.

(56) References Cited

U.S. PATENT DOCUMENTS

| 3,327,776 | A | * | 6/1967 | Butt | 165/80.4 |
| 5,558,155 | A | * | 9/1996 | Ito | 165/80.3 |
| 5,983,997 | A | * | 11/1999 | Hou | 165/144 |
| 6,446,709 | B1 | * | 9/2002 | Huang | 165/80.3 |
| 6,578,626 | B1 | * | 6/2003 | Calaman et al. | 165/80.4 |
| 2001/0001416 | A1 | * | 5/2001 | Lee et al. | 165/80.3 |
| 2002/0007935 | A1 | * | 1/2002 | Marsala | 165/80.2 |
| 2002/0101718 | A1 | * | 8/2002 | Negishi et al. | 361/699 |
| 2004/0182552 | A1 | * | 9/2004 | Kubo | 165/104.33 |
| 2006/0291165 | A1 | * | 12/2006 | Flesch et al. | 361/699 |

FOREIGN PATENT DOCUMENTS

| JP | 06-266474 | 9/1994 |
| JP | 07-142886 | 6/1995 |

* cited by examiner

*Primary Examiner*—Allen J Flanigan
(74) *Attorney, Agent, or Firm*—Antonelli, Terry, Stout & Kraus, LLP.

(57) ABSTRACT

In an electronic apparatus having a heat-generating element therein, a cooling jacket 100 for transmitting heat generated from the heat-generating element 200 into to a liquid coolant flowing therein, comprises: a cover 130 building up a heat transfer surface to be in contact with a surface of the heat-generating element; a passage 110 for the liquid coolant, which is formed neighboring with the heat transfer surface and wound round in a "S"-like manner within an inside of a main body 120 of the cooling jacket; and an inlet 111 and an outlet 112 attached at both ends of the flow passage of the liquid coolant, and further a dispersion member 150 is disposed in the flow passage, being built up by gathering a plural number of members, each of which has a "U"-like cross-section of an aspect ratio from 10 to 20, thereby diffusing the liquid coolant therein, so as to transfer the heat from the heat-generating element thereto with high efficiency, and thereby enabling to cool down the heat-generating element, fully, even with a relatively small amount or volume of the liquid coolant.

2 Claims, 5 Drawing Sheets

FIG.5(a)
FIG.5(b)
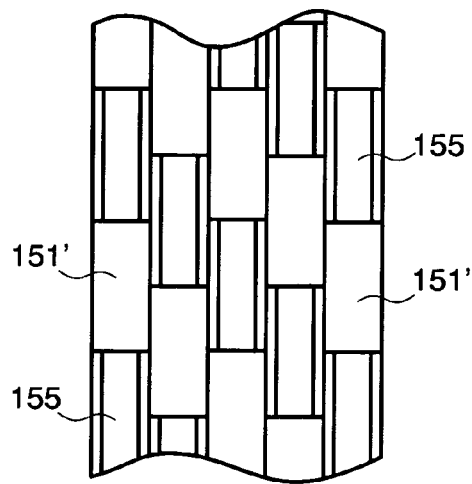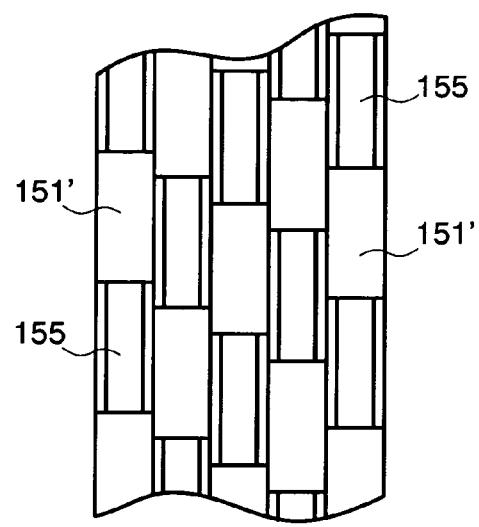
FIG.6(a)
FIG.6(b)
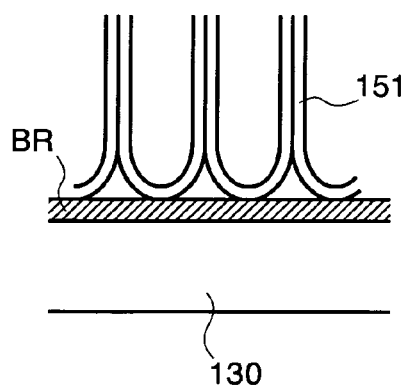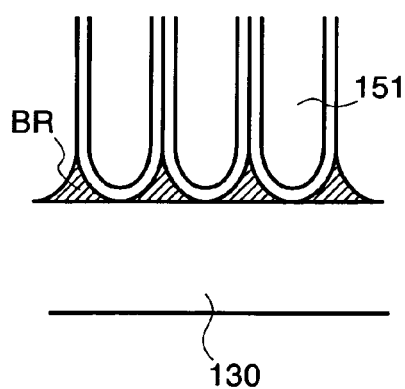

COOLING JACKET

BACKGROUND OF THE INVENTION

The present invention relates to a cooling jacket for transmitting heat-generation into a liquid refrigerant or coolant flowing within an inside thereof, and in particular, it relates to a cooling jacket to be used within a liquid cooling system, for enabling effective cooling of a heat-generating element, within various kinds of electronic apparatuses mounting the said heat-generating element therein, i.e., a semiconductor integrated circuit element, within an inside thereof, such as, a personal computer and a server, and further a notebook-type personal computer, etc.

Conventionally, each of the electronic apparatuses, such as, the personal computers and the servers, and further the notebook-type personal computer, comprises the semiconductor element, as being the heat-generating element, i.e., a CPU (Central Processing Unit), representatively, and for this reason, in general, it necessitates cooing for maintaining a normal operation of the said heat-generating element. Conventionally, for achieving such the cooling is applied, in general, so-called a cooling system of air-cooling type, wherein a heat-transferring member, being formed with fins in one body and called by "heat sink", is attached on the said heat-generating element, thermally connected therewith, while providing a fan for blowing a cooling air thereon.

However, in recent years, accompanying with the tendency of small-sizing and high-integration of the semiconductor integrated circuit element, as being the heat-generating element, and further with high performances thereof, heat-generation is increased in such the heat-generating element, and at the same time localization is also generated, in particular, relating to heat-generating portions thereof. For this reason, attentions are paid on a liquid cooling-type cooling system having high cooling efficiency, which applies water as the coolant thereof, for example, in the place of the conventional air-cooling type cooling system, and it is actually adopted.

As such liquid cooling-type cooling system having high cooling efficiency, to be applied in the electronic apparatus, as was mentioned above, as was already known by the following Patent Documents, etc., in general, a member, being so-called a "heat-receiving jacket" or "cooling jacket", is mounted on the surface of the CPU, as being the heat-generation body, directly, while running a liquid coolant within a flow passage, which is formed within an inside of the heat-receiving jacket. Thus, the heat-generation from the CPU is transmitted into the coolant flowing within the above-mentioned jacket, and thereby cooling the heat-generation body at high efficiency. However, in such the cooling system of liquid cooling type, normally, a heat cycle is built up with using the cooling jacket mentioned above as a heat-receiving portion, and in more details thereof, it comprises a circulation pump for circulating the liquid coolant within the cycle, a radiator to be a heat radiation portion for radiating heat of the liquid coolant into an outside, and further a coolant tank provided in a part of the cycle, depending on the necessity thereof, for storing the liquid coolant therein, and wherein, those are connected through metal tubes or tubes made of an elastic body, such as, rubber, etc., for example.

Patent Document 1: Japanese Patent Laying-Open No. Hei 6-266474 (1994); and

Patent Document 2: Japanese Patent Laying-Open No. Hei 7-142886 (1995).

By the way, within the liquid cooling system of actively circulating the liquid coolant within the system, as was known by the conventional arts mentioned above, the cooling jacket for transmitting the heat from the heat-generation body into the liquid coolant, in general, has such the structures that the flow passage for the liquid coolant is formed within a housing made of a metal, such as, copper or aluminum, etc., or that a metal pipe is welded on a metal plate. However, in recent years, accompanying with an increase of heat value within the heat-generating element, in particular, it is strongly demanded to improve the cooling capacity thereof, and for example, with the radiator, an electromotive fan is further attached thereon, so as to accelerate the heat radiation, compulsively. However, it cannot be said necessarily that sufficient improvements are made, in relation to an improvement of the cooling jacket, in particular, the heat conduction thereof.

Thus, as is apparent from the mentioned above, within the cooling jacket of the conventional art, the liquid coolant cooled down in the radiator flows into the flow passage formed within the metal housing thereof; however in that instance, because the liquid coolant cannot be fully diffused within the flow passage, then it is impossible to fully or sufficiently cool down the heat-generating element, such as, the CPU in recent years, for example, being remarkable in an increase of the heat generation or value thereof. Further, this means that it is important to transmit the heat generated from the heat-generation body into the liquid coolant, with high efficiency, in particular, for the liquid cooling system adopted in the electronic apparatuses, such as, the above-mentioned personal computer and the server, and further the notebook-type personal computer, etc., because an amount or volume of the liquid coolant is very small, which is circulated within the said system, differing from that of the conventional liquid cooling system adopted in the large-scaled computer.

BRIEF SUMMARY OF THE INVENTION

Then, the present invention is accomplished by taking such drawbacks into the consideration thereof, and in more details; it is an object to provide a cooling jacket, for enabling to transmit the heat generated from the heat-generating element into the liquid coolant with high efficiency, and thereby enabling to cool down the heat-generating element, fully, even with a relatively small amount or volume of the liquid coolant.

For accomplishing the object mentioned above, according to the present invention, there is provided a cooling jacket for use in an electronic apparatus having a heat-generating element in a housing thereof, comprising: a main body, being in contact with a surface of said heat-generating element, for transmitting heat generated within said heat-generating element to liquid coolant flowing therein; a flow passage for the liquid coolant, being formed within an inside of said main body of the cooling jacket, being wound round therein; and an inlet and an outlet of the liquid coolant, being attached at both ends of the flow passage of the liquid coolant, and further comprising; a dispersion member disposed in said flow passage being formed to be wound round, which is built up with a plural number of plate-like members piled up to be aligned in same direction within said flow passage of the liquid coolant, wherein said flow passage of the liquid coolant is dispersed into a plural number of channels, and an aspect ratio of each of the channels, which are defined by said dispersion members between said dispersion members, lies in a range from 10 to 20.

Also, according to the present invention, in the cooling jacket as is described in the above, preferably, said dispersion member is built up by gathering a plural number of members, each having a "U"-like cross-section, or a plural number of tube-like members, each having an elliptical cross-section, or a plural number of members, each having a "C"-like cross-section. Further, according to the present invention, it is preferable that further an opening is formed on a surface of said dispersion member.

BRIEF DESCRIPTION OF THE SEVERAL VIEWS OF THE DRAWING

Those and other objects, features and advantages of the present invention will become more readily apparent from the following detailed description when taken in conjunction with the accompanying drawings wherein:

FIGS. 5(a) and 5(b) are upper views for showing the structures of other examples of the diffusion member, which is built up with the member shown in FIG. 3;

FIGS. 6(a) and 6(b) are views for explaining an example of a process for attaching a cover of the cooling jacket onto an upper surface of a main body to be fixed thereon, liquid-hermetically.

DETAILED DESCRIPTION OF THE INVENTION

Hereinafter, embodiments according to the present invention will be fully explained by referring to the attached drawings.

Figure 1:
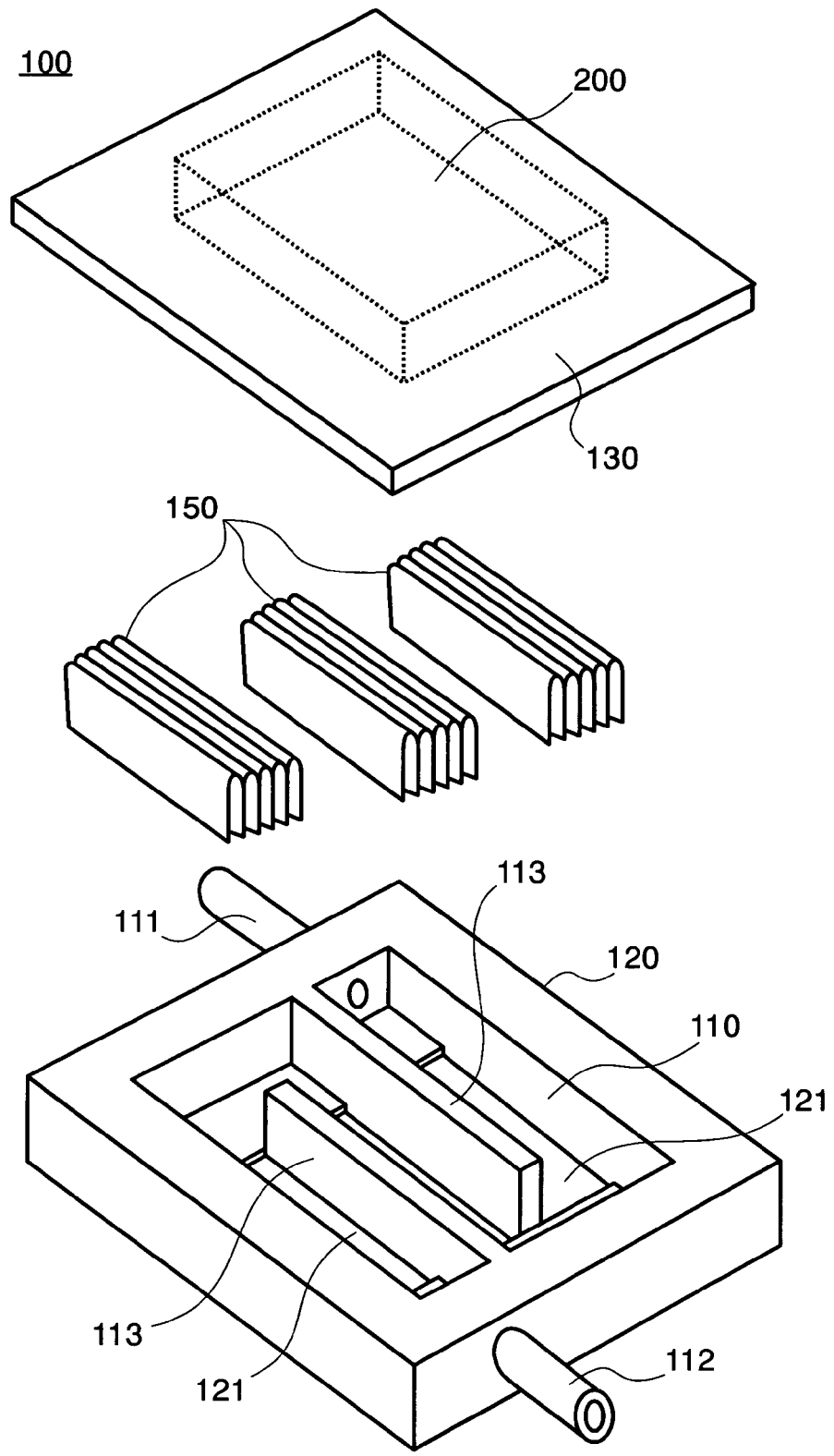
FIG. 1 is an exploded perspective view for showing the entire structures of a cooling jacket, according to an embodiment of the present invention.

First of all, FIG. 1 shows the structures of a cooling jacket, according to an embodiment of the present invention, through the exploded perspective view thereof. Also, this cooling jacket builds up so-called a liquid cooling system, within an electronic apparatus including the heat-generating element (for example, the CPU, etc.) within an inside of a housing thereof, such as, the personal computer and the server, and further the notebook-type personal computer, etc., for example, for cooling said heat-generating element by circulating a liquid coolant therein, with high efficiency.

The cooling jacket 100, as is apparent from the figure, has an outlook, being approximately rectangular in the configuration thereof, and also it comprises a main body 120, which includes a passage 110 for the liquid coolant therein, winding round in an approximately "S"-like shape, and a plate-like cover 130 to be attached on the main body 120, covering over the upper surface thereof. The main body 120 is made of a metal having superior heat conductibility, such as, copper, aluminum, etc., for example. In more details thereof, the main body 120 has sizes, (vertical) 30 mm×(horizontal) 40 mm× (height) 5 mm, in the outer configuration, and the passage 110 is formed through the machining or the press working, winding approximately "S"-like. Further, a reference numeral 121 in the figure depicts step-like portions, each of which is formed around a center of the winding passage 110, and into this portion will be inserted a diffusion (or dispersion) member 150, for diffusing the liquid coolant flowing within the passage 110, to be fixed therein, as will be explained later.

Also, at both ends of the "S"-like winding passage 110 formed within the main body 120 are inserted, for example, pipes 111 and 112 made of a metal, to be fixed therein, and thereby forming an inlet and an outlet of the liquid coolant into the cooling jacket. Also, a reference numeral 113 depicts wall-surface portions, each projecting within the main body 120, so as to divide the "S"-like winding passage 110 mentioned above.

On the other hand, also the cover 130 is made from a metal plate (for example, having thickness of 2 mm), being superior in the thermal conductivity, such as, copper, aluminum, etc., in the similar manner to that of the main body 120 mentioned above, being cut out into a predetermined shape, for example, (vertical) 30 mm×(horizontal) 40 mm. Further, as is apparent from the figure, the cover 130 will be fixed on the main body 120 mentioned above, when the cooling jacket 100 is completed, and thereby building up a heat transfer surface thereon, to be contacted on the surface of the heat-generating element 200.

Figure 2A:
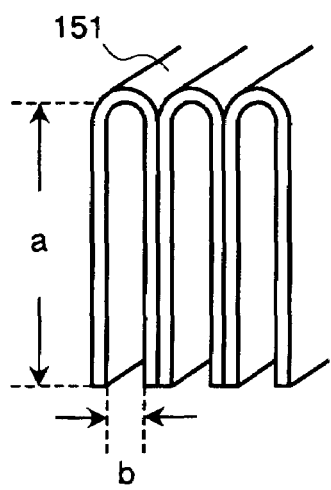
FIGS. 2(a) to 2(c) are partial enlarged view for explaining the detailed structures of members for building up a diffusion element in the cooling jacket mentioned above.
Figure 2B:
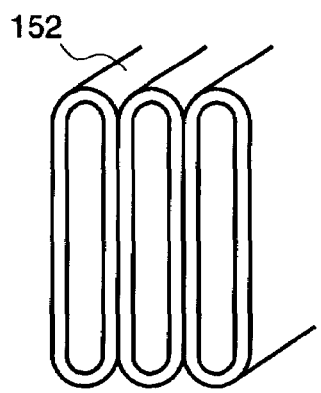
Figure 2C:
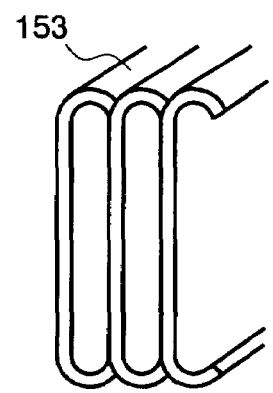

Next, into portions of the "S"-like winding passage 110 of the main body 120, i.e., at around the central portions on the three (3) pieces of passages making up the straight-line portions of the "S"-like winding passage 110, and in particular, that corresponding to the step-like portions 121, there will be inserted the diffusion members 150 mentioned above, to be fixed therein, and the more detailed structures of the diffusion member 150 will be shown in FIGS. 2(a) to 2(c) attached herewith.

First, FIG. 2(a) shows one example of piling up a plural number of members 151, each being "U"-like in the cross-section thereof, thereby making up the diffusion members 150, and this is same to the diffusion member 150 shown in FIG. 1 mentioned above. However, the members 151 is also made from a metal plate (for example, having thickness of 0.3 mm), being superior in the thermal conductivity, such as, copper, aluminum, etc., in the similar manner to that of the main body 120 and the cover 130 mentioned above, being bent into the "U"-like shape.

However, those "U"-like members 151 are inserted into portions of the "S"-like winding passages 110, thereby to achieve function of dispersing the liquid coolant flowing within the passage into the plural number of channels. For that purpose, it is found from various kinds of experiments that it is preferable to determine an aspect ratio (such as, a/b) to be about 10 to 20, approximately, of the cross-section of the channel (i.e., a guide groove), which is made up by the member 151. Herein, "a" is the height of the flow passage (i.e., the guide groove) and "b" the width of the member 151, as is apparent from the figure.

Namely, with provision of the diffusion member 150 having such the structures as mentioned above, since the liquid coolant absorbing the heat from the heat-generating element 200 while flowing within the "S"-like winding passages 110 is diffused into the direction for diffusion on the way of the "S"-like winding passages 110, therefore it is possible to transfer the heat from the heat-generating element into the liquid coolant, effectively, and thereby enables to cool down the heat-generating element, fully, even with using a relatively small amount or volume of the liquid coolant therein.

Also, FIG. 2(b) shows other example of gathering and piling up a plural number of pipe or tube-like members 152, each having an elliptical cross-section, in the place of the "U"-like members 151, thereby building up the diffusion member 150. Further, FIG. 2(c) shows also other example of gathering and piling up a plural number of members, each being "C"-like in the cross-section thereof, thereby building up the diffusion member 150. Also within those variations, each the member 152 or 153 is made from a metal plate (for example, having thickness of 0.3 mm), being superior in the thermal conductivity, such as, copper, aluminum, etc., in the similar manner to that of the main body 120 and the cover 130 mentioned above, being formed into the predetermined shape thereof. As was shown in FIGS. 2(a), 2(b) and 2(c), since each of the diffusion members 151, 152 and 153 has a curved portion at and end thereof, it is possible to position the width "b" of a group of channels, equally and easily, but without necessity of a special jig or member, for the positioning thereof. Also, for the purpose of increasing the heat conductivity into the liquid coolant, it is preferable to make the width of channel as small as possible, so as to align the diffusion member 150 with increasing the number of pieces thereof as much as possible. Thus, the effect on positioning of the channel width by means of the curved portions of the diffusion member 150 comes to be effective, in particular, for increasing the performances of the cooling jacket, in which a large number of diffusion members must be aligned at a very small gap therebetween. Also, since those members 152 and 153 can diffuse the liquid coolant on the way thereof, which flows within the "S"-like winding passages 110, into the direction of heat diffusion, in the similar manner to that of the "U"-like members 151, it is possible to transfer the heat from the heat-generating element into the liquid coolant, effectively, and therefore this enables to cool down the heat-generating element, fully, even with using the relatively small amount or volume of the liquid coolant therein.

Figure 3:
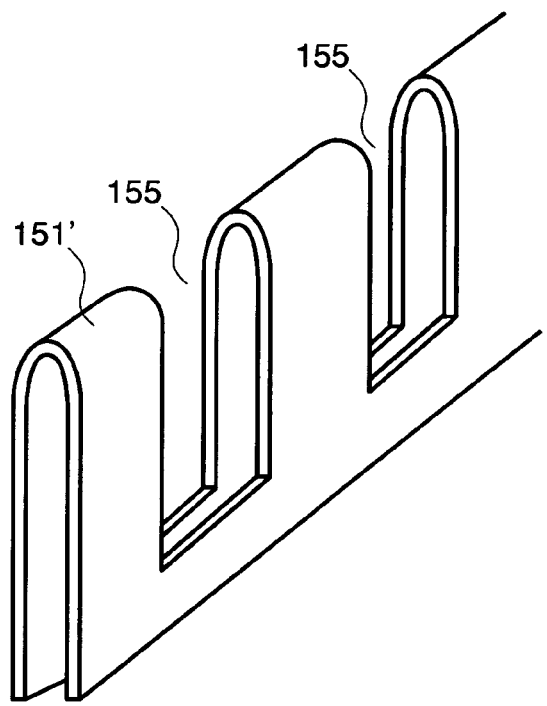
FIG. 3 is a partial enlarged view for showing a variation of the member for building up the diffusion member mentioned above.

FIG. 3 shows a member 151' forming an opening 155 on a wall surface thereof, as a variation of the "U"-like member 151 mentioned above.

Figure 4:
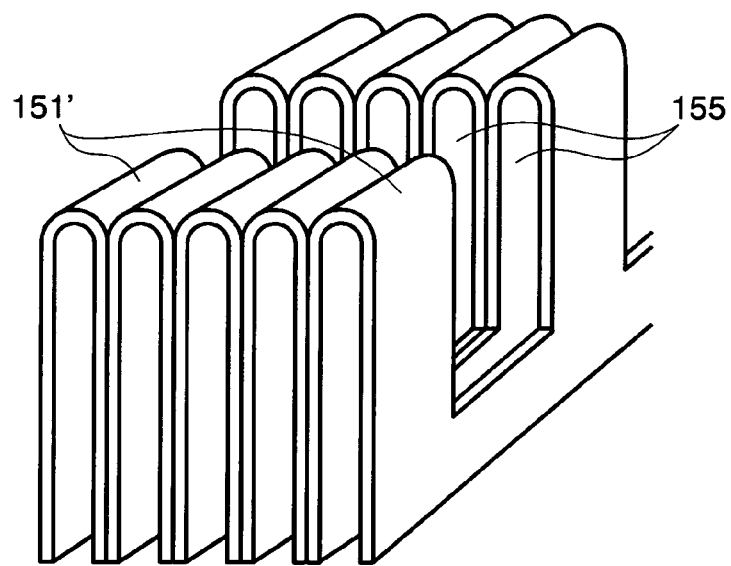
FIG. 4 is an enlarged perspective view for showing the structures of the diffusion member, which is built up with the member shown in FIG. 3.

Further, FIG. 4 shows the condition of gathering and piling up a plural number of the members 151', each forming the opening 155 therein, and in this example, they are disposed so that openings 155 of the members 151' neighboring to each other are aligned in the horizontal direction. Thus, with the diffusion member 150 of gathering and piling up the members 151' of such structures in the plural number thereof, the liquid coolant flowing therein is diffused on the way through the openings 155 mentioned above, and therefore it is possible to achieve the transmission of heat from the heat-generating element to the liquid coolant with high efficiency.

Further, in the variations mentioned above, although there is shown the structures of disposing the plural number of members 151' for building up the diffusion member 150, so that the openings 155 thereof are aligned in the horizontal direction; however in the place thereof, they may be filed up on each other so that the openings 155 are shifted in the position by a predetermined gap to one another (i.e., staggered), as is shown in FIG. 5(a), or as shown in FIG. 5(b), they may be positioned at random. However, also with such the structures, the liquid coolant flowing within the diffusion member can be further diffused on the way through the openings 155, and therefore it is possible to achieve the transmission of heat from the heat-generating element to the liquid coolant with high efficiency. Further, because intermittence of the channel wall on the way by the openings 155 divides boundary layers of temperature, which are generated in the liquid coolant in the vicinity of the channel wall, therefore it is possible to obtain an improvement of heat transfer due to so-called the front edge effect.

Following the above, explanation will be made in brief, about a manufacturing method of the cooling jacket, the detailed structures was explained in the above, as well as, the variations thereof. As was mentioned previously, into the main body 120, which is made through the machining or the press working of a metal, such as, of copper, aluminum, etc., in particular, into the step-like portions 121, which are formed in portions of the "S"-like winding passages 110, there are inserted the diffusion members 150 (in the present embodiment, the members 151), each of which is also formed by bending and cutting the metal plate, and thereafter, upon the upper surface of the main body is attached the cover 130 made of a metal, such as, the copper or aluminum, etc., liquid-hermetically, thereby to be completed. However, in that instance, in particular, when attaching the cover 130 onto the upper surface of the main body 120, to be fixed hermetically, it can be achieved through brazing of copper or silver, easily.

First of all, for example, a sheet-like brazing material BR of copper or silver is attached on the upper surface of the main body 120, and on it is mounted the cover 130 mentioned above, at a predetermined position thereon. Thereafter, as is shown in FIG. 6(a) attached herewith, the brazing is carried out thereon, through heating within a furnace, turning them upside down. In that instance, as is shown in FIG. 6(b) attached, the brazing material BR enters into between the main body 120 and the cover 130, thereby bonding between both of them, and as is shown by oblique lines in the figure, it also enters into a gap defined between the cover 130 and the members 151, which build up the diffusion member 150. Since the curved portion is formed at an each end of the diffusion members 151 (i.e., connecting portions between the cover 130), the brazing material inters into spaces defined at the connecting portions between the curved portions of the diffusion members neighboring with each other and the cover 130, thereby improving the adhesive property thereof (i.e., improving the heat conductivity from the cover 130 into the diffusion members 151), as well as, preventing the brazing material from entering into between the diffusion members defining the channels. This effect can be also obtained in the similar manner, for any one of the members, each having the "U"-like cross-section, the tube-like members, each having the elliptical cross-section, and the members, each having the "C"-like cross-section, as are shown in FIGS. 2(a), 2(b) and 2(c). For this reason, it is possible to obtain the liquid-hermetical connection between the main body 120 and the cover 130, with certainty, but without blocking or clogging the channels formed within the members.

Figure 7:
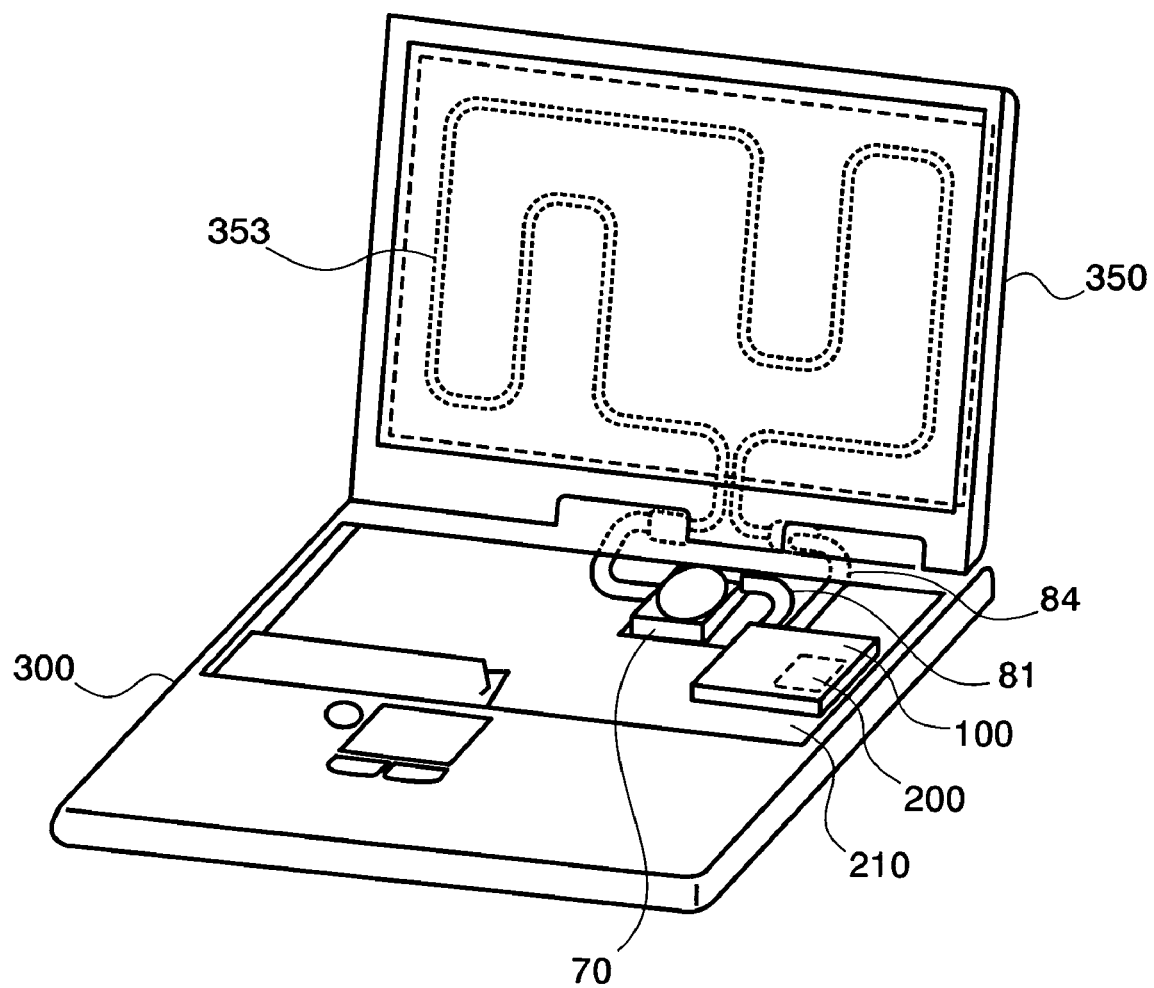
FIG. 7 is a perspective view, exploding a portion thereof, for showing the condition of installing the cooling jacket mentioned above into a notebook-type personal computer, as a liquid cooling system for an electronic apparatus.

In addition thereof, an example is shown in FIG. 7 attached, wherein the cooling jacket, the detailed structures of which are given in the above, is applied into the notebook-type personal computer, as being an electronic apparatus, to be the liquid-cooling system thereof. Thus, this FIG. 7 shows the structures of the personal computer, being called by the notebook type, in general, which is constructed with a main body 300 of personal computer, and also a cover 350 attached onto the said main body in a freely open/closable manner through a hinge mechanism, for example.

However, in this figure, the main body is shown under the condition of removing a keyboard portion thereof, which is normally attached on the surface thereof, for the purpose of showing an inside thereof. Also, within the personal computer of the notebook type demanded to be small in sizes thereof, as well as, lightweight and portable, differing from the personal computer of the desktop type, in general, so-called a radiator portion is built up with a metal plate disposed on a reverse side of a liquid-crystal display, which is attached on an inner side-surface of the cover 350, and a metal conduit 353 wound round on the surface of the metal plate, thereby discharging the heat of the apparatus into an outside thereof. Further, the cooling jacket 100 mentioned above builds up the liquid cooling system, together with a circulation pump 70, including the radiator portion therein. Thus, the liquid coolant (for example, a water, or a water mixed with so-called an anti-freezing solution, such as, propylene glycol, etc., for example, at a predetermined ratio), which is driven by means of the circulation pump 70, flows through the radiator portion and also the cooling jacket 100.

And, on a wiring board 210, which is disposed on a bottom portion of the main body 300, is mounted the CPU 200, i.e., the heat-generating element, and on an upper surface of which is attached (for example, being fixed by means of screws, etc.) the heat-receiving jacket 100 under the condition of being in surface-contact with each other (or, through a heat-conductive grease put between them). Also, between various portions building up the heat cycle are connected tubes (i.e., conduits) 81, each of which is made of a metal, for example, as the passages for the liquid coolant, which the liquid coolant therein hardly leaks through into an outside. Further, a reference numeral 84 in the figure depicts a hinge pipe for connecting between the main body 300 of the personal computer and the cover 350 thereof.

As was fully mentioned above, according to the present invention, it is possible to obtain a superior effect of providing the cooling jacket, which can be manufactured, in relatively ease and cheaply, for enabling to transmit the heat generated from the heat-generating element into the liquid coolant with high efficiency, and thereby enabling to cool down the heat-generating element, fully, even with a relatively small amount or volume of the liquid coolant.

The present invention may be embodied in other specific forms without departing from the spirit or essential feature or characteristics thereof. The present embodiment(s) is/are therefore to be considered in all respects as illustrative and not restrictive, the scope of the invention being indicated by the appended claims rather than by the forgoing description and range of equivalency of the claims are therefore to be embraces therein.

What is claimed is:

1. The cooling jacket for use in an electronic apparatus having a heat-generating element in a housing thereof, comprising:

a main body, being in contact with a surface of said heat-generating element, for transmitting heat generated within said heat-generating element to liquid coolant flowing therein;

a flow passage for the liquid coolant, being formed within an inside of said main body of the cooling jacket, being wound round therein;

an inlet and an outlet of the liquid coolant, being attached at both ends of flow passage of the liquid coolant; and a dispersion member disposed in said flow passage being formed to be wound round, which is built up with a plural number of plate-like members piled up to be aligned in same direction within said flow passage of the liquid coolant;

wherein said flow passage of the liquid coolant is dispersed into a plural number of channels, and an aspect ratio of each of the channels, which are defined by said dispersion members between said dispersion members, lies in a range from 10 to 20; and wherein said dispersion member is built up by gathering a plural number of tube-like members, each having an elliptical cross-section.

2. The cooling jacket, as is described in the claim 1, wherein further an opening is formed on a surface of said dispersion member.

* * * * *